Nov. 5, 1935.  P. M. NEJEDLY  2,019,721
CONTROLLING MECHANISM FOR STEMMING MACHINES
Filed Oct. 17, 1934  3 Sheets-Sheet 1
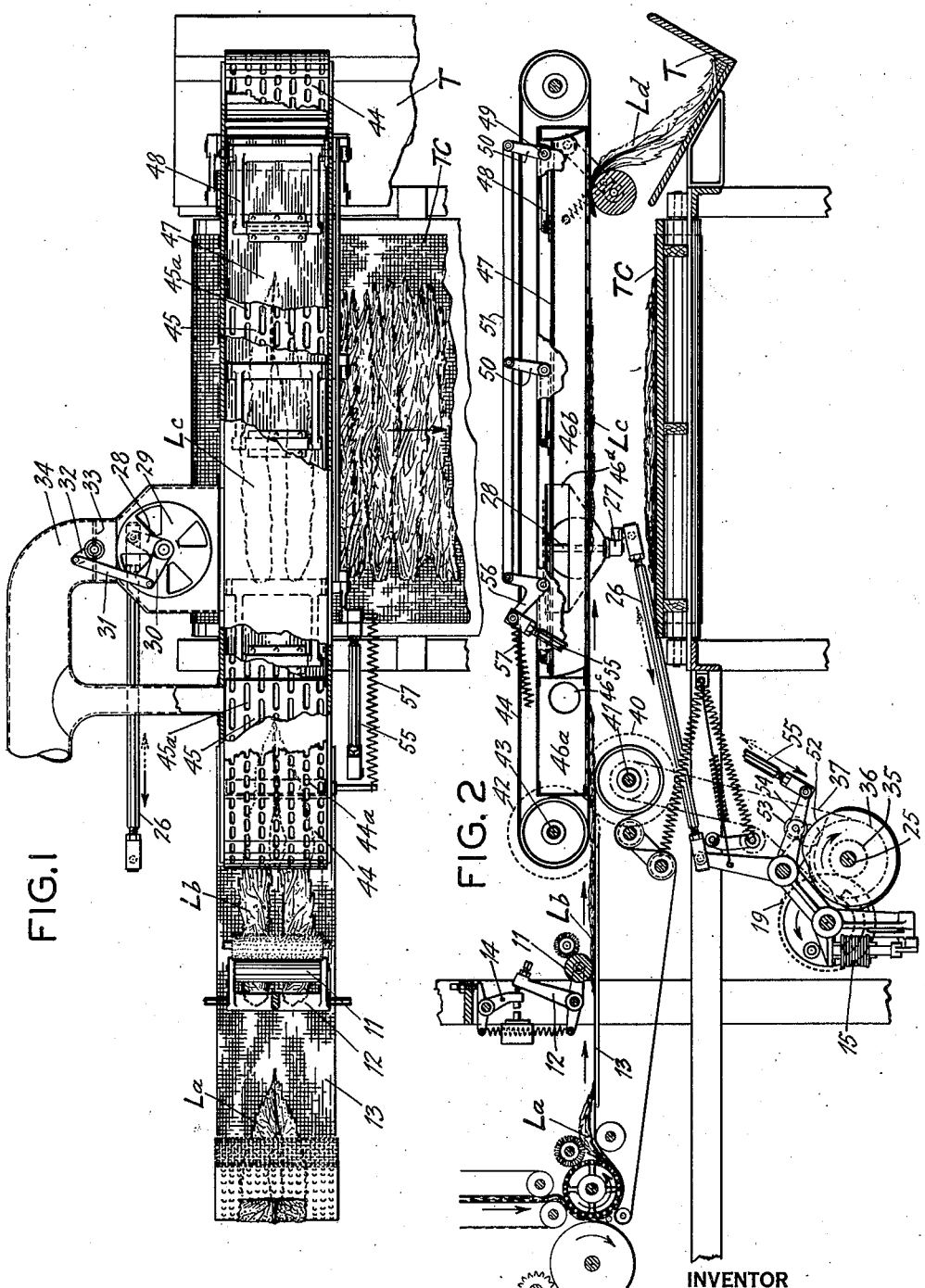
INVENTOR
Peter M. Nejedly
BY
Sydney P. Prescott
ATTORNEY Nov. 5, 1935.　　　　P. M. NEJEDLY　　　　2,019,721
CONTROLLING MECHANISM FOR STEMMING MACHINES
Filed Oct. 17, 1934　　　3 Sheets-Sheet 2
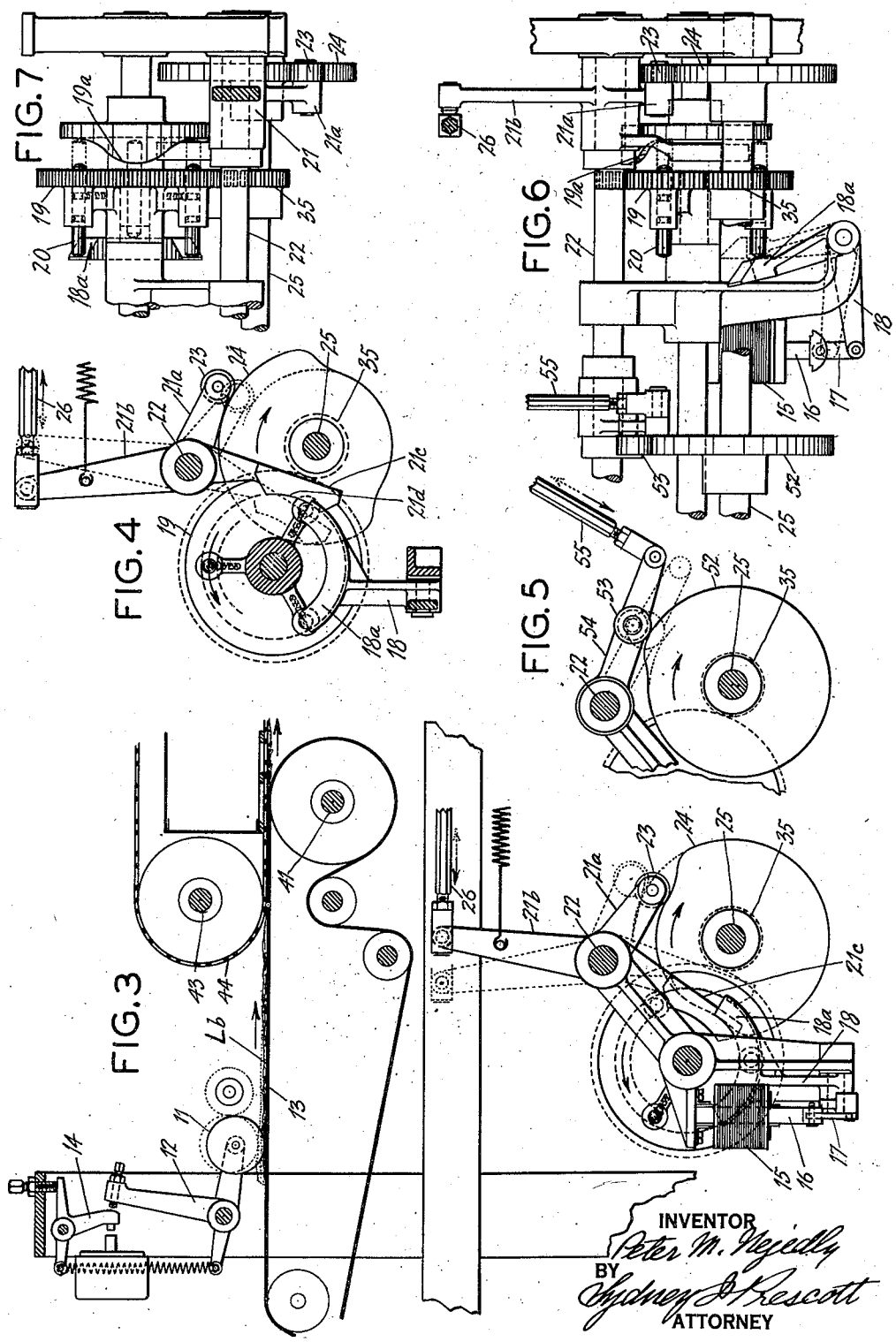
INVENTOR
Peter M. Nejedly
BY
Sydney P. Prescott
ATTORNEY Nov. 5, 1935.　　　P. M. NEJEDLY　　　2,019,721
CONTROLLING MECHANISM FOR STEMMING MACHINES
Filed Oct. 17, 1934　　　3 Sheets-Sheet 3
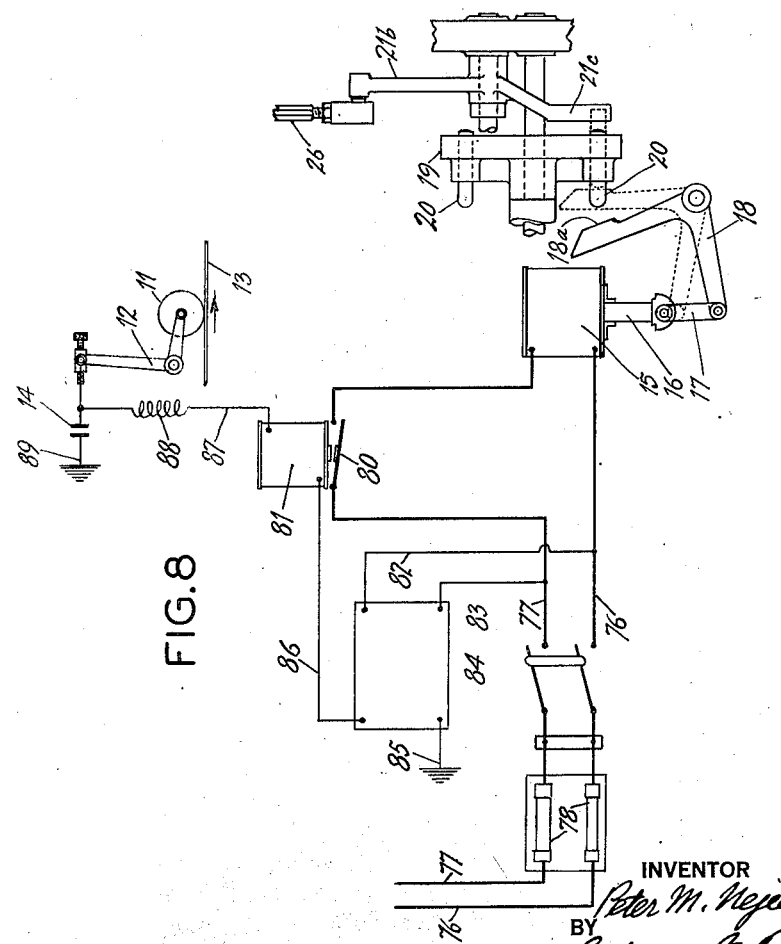

Patented Nov. 5, 1935

2,019,721

UNITED STATES PATENT OFFICE 2,019,721

CONTROLLING MECHANISM FOR STEMMING MACHINES

Peter Martin Nejedly, Hollis, N. Y., assignor to International Cigar Machinery Company, a corporation of New Jersey Application October 17, 1934, Serial No. 748,757

16 Claims. (Cl. 131—57)

This invention relates to an improvement in tobacco stemming machines, and more particularly to controlling mechanism for causing the separation of the unstemmed or incompletely stemmed leaves from the stemmed leaves in the machine.

In operating tobacco stemming machines it often happens that a leaf will slip by unstemmed, and, if not detected and removed by the attendant, it would be gathered in with the leaves which have been properly stemmed. Since none of the prior stemming machines are provided with means for automatically picking out the unstemmed leaves, a great deal of annoyance is thus caused after the stemmed material has been put into use in cigar machines or other tobacco manufactures where the presence of coarse stems is objectionable. Accordingly, the main object of this invention is to detect and separate the unstemmed leaves from the stemmed leaves in tobacco stemming machines.

The present invention overcomes this difficulty by preventing an improperly stemmed or unstemmed leaf from being deposited with the leaves which have passed satisfactorily through the stemming operation, by carrying it along and depositing it in a trough from which the collected leaves may be returned and run through the machine a second time. For this purpose there is provided a device which detects the unstemmed leaf and controls its destination, consisting of a roller which is held in contact with the leaf as it travels from the stemming unit to the delivery apron. This roller is suspended in one arm of a bell-crank, the other arm of which closes an electric contact.

When a completely stemmed leaf passes under the roller it does not raise the roller sufficiently to cause the bell-crank to function as a circuit maker, but when a leaf with the stem part left in it passes under the roller the bell crank will be lifted high enough to complete the contact and thereby energize a solenoid and set the controlling mechanism into operation, thus causing the suction conveyor to carry the unstemmed leaf beyond the point where the properly stemmed leaves are normally deposited, and deliver it in the trough provided to receive the unstemmed leaves.

With these and other objects not specifically mentioned in view, the invention consists in certain constructions and combinations hereinafter fully described and then specifically set forth in the appended claims.

Referring to the drawings which form a part of this specification and in which like characters of reference indicate the same or like parts:

Fig. 1 is a schematic plan view of the conveyor mechanism which delivers the stemmed leaves from the stripping mechanism of the stemming machine, showing leaves emerging from the stripping mechanism and being transferred to their destination, and the device for detecting unstemmed leaves;

Fig. 2 is a sectional elevation of Fig. 1;

Fig. 3 is a detail view on an enlarged scale of a portion of the conveyor mechanism shown in Fig. 2, illustrating the operation of the detector;

Fig. 4 is a detail view showing the position of the control mechanism linkage for maintaining full suction on the suction conveyor when an unstemmed leaf is being transported;

Fig. 5 is a view showing setting of "expeller" operating gear, when about to function;

Fig. 6 is a side elevation combining views shown in Figs. 3 and 5;

Fig. 7 is a plan view of part of Fig. 6; and

Fig. 8 is a wiring diagram showing the electric circuit between the detector roller and the solenoid, which sets the control mechanism into operation.

The control mechanism is illustrated in Figs. 1 and 2 in conjunction with a stemming machine of the general type shown in the co-pending application of R. E. Rundell et al., Serial Number 677,336, filed June 23, 1933, and now Patent No. 1,981,470, dated Nov. 20, 1934, and its construction is as follows: The detector roller 11 mounted in one end of a bell crank 12 rests on the traveling belt conveyor 13 of the stemming machine. The upper end of bell crank 12 is provided with a stop-screw arranged to actuate a contact maker 14 of the electric circuit of a solenoid 15 and a tension spring is connected to lugs on the hubs of the bell crank and contact maker 14, whereby the latter is normally held in open position and the roller 11 is lightly pressed against the belt 13. The wiring diagram of the solenoid circuit and the operation of the solenoid are illustrated in Fig. 8 and will be described later.

Core 16 of solenoid 15 is connected through link 17 with a bell-crank lever 18 provided on its upper end with an arcuate head 18a, as shown in Figs. 3, 4, and 6. In the web of gear wheel 19 are slidably mounted a number of pins 20. A three-arm lever 21 fulcrumed on rod 22 has on arm 21a a roller 23 which rests on a cam 24 on drive shaft 25 driven from the main drive of the stemming machine. The arm 21b is linked through rod 26 with a crank 27 on shaft 28. On the upper end of shaft 28 is fastened a disc valve 29 and a crank 30 which is connected through link 31 and crank 32 with a butterfly valve 33 in the suction duct 34. A third arm 21c of lever 21 extends downward and has a curved shoe 21d adjacent the path of the pins 20 in the gear 19.

During one revolution of shaft 25 the gear 35 thereon turns the gear 19 one third of a revolution, and over the sprocket 36 on shaft 25 runs a chain 37, Fig. 2, which rotates sprocket 38 on transfer conveyor drive shaft 41 two revolutions, for every revolution of shaft 25. As the gear 40 on shaft 41 meshes with a gear 42 of the same diameter on the suction drive shaft 43, the two conveyors 13 and 44 travel at the same speed, and are also synchronized with the drive of the stemming machine so that one revolution of drive shaft 25 advances the leaves on the conveyors the same distance and with the same spacing that they are advanced through the stemming unit of the stemming machine. The transfer conveyor 13 is an ordinary endless belt but the suction conveyor belt 44 has several rows of perforations 44a, aligned with longitudinal slots 45a in the bottom wall 45 of suction chambers 46a and 46b. Suction conduit 34 communicates with the chambers 46a and 46b through apertures 46c and 46d in the rear walls of the chambers 46a and 46b, respectively.

In Figs. 1 and 2, the leaves La, Lb, Lc and Ld are shown in progressive stages as they emerge from the stemming unit of the stemming machine and are advanced on the transfer conveyor 13 and the suction conveyor 44. Leaf La is shown about half way through the stemming operation; leaf Lb on the transfer belt 13 is passing under the detector roller 11 of the controlling mechanism; leaf Lc is held on the lower run of the suction conveyor 44, the suction in box 46b having just been turned off so that leaf Lc is ready to be dropped and carried away on the delivery apron or transverse conveyor TC. At the end of the suction conveyor 44 is shown the leaf Ld, which has passed through the stemming unit without being stemmed and, due to the controlling mechanism, has been carried past the transverse conveyor TC without being dropped, and in position to be deposited in the trough T.

As the leaf Lb, Figs. 1, 2, and 3, passes under the detector roller 11 of the controlling mechanism, the roller will rise only slightly if the stem of the leaf has been removed, and the solenoid circuit will remain open. While the leaf is advanced by the transfer belt conveyor 13 it will be picked up by the suction conveyor 44 due to the suction in the chamber 46a. Thereupon leaf Lb is carried beyond the suction chamber 46a, which is subjected to constant suction, and as it reaches the middle section of suction chamber 46b, the leaf will drop when the suction is momentarily cut off by the butterfly valve 33, just as roller 23 runs off the high point of cam 24.

In order to expedite the dispatching of the leaf Lc from the delivery conveyor 44 onto the transverse conveyor TC, Fig. 2, after the suction has been cut off from chamber 46b, a plate 47 closely fitting the interior of the chamber 46b is lowered immediately after the disk valve 29 is opened, thus compressing the air in the bottom of the chamber and forcing it through the perforated bottom wall of the chamber and corresponding perforations in the conveyor belt against the leaves to remove them. The plate 47 with its operating connections may be termed as "expeller".

The plate 47 is suspended from levers 48 on shafts 49 carrying cranks 50 connected by a link 51 and operated by a cam 52, Figs. 2 and 5, through the cam follower 53 on the lever 54 loose on shaft 22 and connected by a rod 55 to a bell-crank lever 56 pivoted to link 51. A spring 57 acting on bell crank 56 assures the drop of the plate 47 as roller 53 runs off the high point on the cam 52.

If, as indicated by the dotted position of the detector roller in Fig. 3, the stem or any part of it exceeds the maximum allowable thickness to which detector roller 11 is set, the bell crank 12 establishes a contact in the electric circuit of the solenoid 15 and thus energizes the solenoid whereby link 17 will swing bell-crank lever 18 into a vertical position, as indicated by dotted lines in Fig. 6 and by full lines in Figs. 4 and 7. In this manner the arcuate head of lever 18 engages and pushes one of the pins 20 through gear 19 so as to project beyond the web of the gear, and, as gear 19 rotates, the pin will prevent the arm 21c of lever 21 from swinging into the position shown by full lines in Fig. 3 and by dotted lines in Fig. 4, which it would otherwise do when roller 23 runs off the high point of the cam 24. During the engagement of the pin 19 with the shoe 21d of arm 21c the suction in chamber 46b remains on full, whereby the leaf is carried along to the end of the suction conveyor 44 and deposited in the trough T as indicated by position of leaf Ld in Fig. 2. As gear 19 continues to rotate, pin 20 will ride off the shoe 21d of arm 21c and will be pushed back through its bearing in the web of gear 19 by the stationary cam 19a. If the next leaf passes under the detector roller 11 without establishing contact in the solenoid circuit and energizing the solenoid 15, the pin 20 will remain at inoperative position and the suction will be cut off in chamber 46b so as to deposit the leaf on the transverse conveyor TC.

It should be noted that the plate 47 in suction chamber 46b is operated by cam 52, assisted by spring 57, and would therefore drop once for each revolution of cam 52, were it not for the suction present in chamber 46b, which is not cut off when the detector roller 11 sets the controlling mechanism into operation, as previously described. Thus, due to the greater degree of suction above the plate 47, the latter is held up against the lesser pressure of spring 57 by the pressure of the air sucked through the space below the plate 47.

During each revolution of drive shaft 25 the leaves advance the same distance on the conveyors 13 and 44 as they are advanced while passing through the stemming unit, and as gear 19 rotates one third of a revolution for each revolution of the drive shaft 25 and, in the embodiment illustrated, has three pins 20 for blocking the arm 21c of the suction controlling lever 21, it follows that during the advance of each leaf there would be an opportunity to prevent cutting off the suction in the chamber 46b as each leaf is carried along by the suction conveyor 44 if the condition of the leaf would warrant it.

The control of this feature therefore rests with the detector device, and its dependability is assured by the provisions made for very close adjustments of the contact maker.

A diagram of the electrical circuits for operating the control mechanism is shown in Fig. 8 and will now be described.

The A. C. supply lines 76 and 77 are connected through fuses 78 and a double knife switch 79 to the solenoid 15. Line 76 is directly connected to the solenoid 15 and a switch 80 in the main 77 is controlled by a relay 81. The current for energizing the relay 81 is tapped from lines 76 and 77 by wires 82 and 83 respectively leading to the primary of a step-down transformer 84. One terminal of the secondary of the transformer is grounded at 85, and the other terminal is connected by a wire 86 to the one end of the coil of the relay 81. The other end of the coil on the relay is connected by wire 87 through a resistance 88 to one terminal of the contact maker 14 of the control mechanism, the other terminal of the contact maker being grounded at 89.

The contact maker 14 is so adjusted that when a leaf with a heavy stem passes under roller 11, bell crank 12 will swing the contact maker 14 inwardly to close the circuit through the relay 81, whereupon the switch 80 will be closed and the solenoid 15 will be energized. The energizing of the solenoid will cause its core to move and, through the various connections hereinbefore described prevent the cutting off of the suction as already described.

While the invention has been described in conjunction with a stemming machine, it will be understood that it may be used with stemming and booking machines, or with tobacco working or handling mechanism.

What is claimed is:

1. In a tobacco stemming machine, the combination with a device for detecting unstemmed leaves, of mechanism controlled by said device for separating the unstemmed leaves from the stemmed leaves.

2. In a tobacco stemming machine, the combination with a device for detecting unstemmed leaves, of mechanism controlled by said device for separating the unstemmed leaves from the stemmed leaves, said device including a traveling belt arranged to forward outspread tobacco leaves on its upper run, a bell crank, a detector roller mounted in one end of said bell crank to engage the leaves forwarded on said belt, a solenoid, an electric circuit through said solenoid, a driven gear carrying a series of pins displaceable axially thereon, a lever linked to the core of said solenoid to displace one of said pins when the solenoid is energized, a relay adapted to open and close said solenoid circuit, a circuit through said relay, and a pivoted contact maker arranged to be swung by said bell crank into position to close said relay circuit when an unstemmed leaf is forwarded under said detector roller by said belt, whereby said solenoid is energized and one of said pins is displaced axially of said gear.

3. In a tobacco stemming machine, the combination with a device for detecting unstemmed leaves, of mechanism controlled by said device for separating the unstemmed leaves from the stemmed leaves, said device including a traveling belt arranged to forward outspread tobacco leaves on its upper run, a bell crank, a detector roller mounted in one end of said bell crank to engage the leaves forwarded on said belt, a solenoid, an electric circuit through said solenoid, a driven gear carrying a series of pins displaceable axially thereon, a lever linked to the core of said solenoid to displace one of said pins when the solenoid is energized, a relay adapted to open and close said solenoid circuit, a circuit through said relay, a pivoted contact maker arranged to be swung by said bell crank into position to close said relay circuit when an unstemmed leaf is forwarded under said detector roller by said belt, whereby said solenoid is energized and one of said pins is displaced axially of said gear, and said mechanism including a suction chamber adapted to be connected to a source of suction and provided with rows of holes in its bottom, an endless suction conveyor having its lower loop running over the bottom of said chamber and provided with rows of perforations aligned with said holes, a valve adapted to cut off the suction in said chamber, and linkage connected to said valve to close it and arranged to be obstructed when one of said pins is displaced on said gear, whereby the closing of the valve is prevented and the unstemmed leaf is carried beyond the position at which the stemmed leaves are deposited.

4. In a tobacco stemming machine, the combination with a device for detecting unstemmed leaves, of mechanism controlled by said device for separating the unstemmed leaves from the stemmed leaves, said mechanism including a traveling belt arranged to forward outspread tobacco leaves on its upper run, a delivery apron, suction means normally operating to remove the leaves from said belt and deposit them on said apron, and means controlled by said device for causing said suction means to carry and deposit the unstemmed leaves beyond said apron.

5. In a tobacco stemming machine, the combination with a device for detecting unstemmed leaves, of mechanism controlled by said device for separating the unstemmed leaves from the stemmed leaves, said mechanism including a traveling belt arranged to forward outspread tobacco leaves on its upper run, a delivery apron, a suction conveyor operating to pick up the leaves from said belt, and means for periodically cutting off the suction along a portion of said conveyor to deposit the leaf adhering to said portion onto said apron, said device operating to incapacitate said means when an unstemmed leaf is detected on said belt, whereby the unstemmed leaf is carried and deposited beyond said apron.

6. In a tobacco stemming machine, the combination with a device for detecting incompletely stemmed leaves, of suction mechanism controlled by said device for separating the incompletely stemmed leaves from the properly stemmed leaves.

7. A tobacco sorting device for treated tobacco leaves comprising suction mechanism for the leaves capable of depositing the leaves in either one of a plurality of groups, a detector co-acting with said mechanism to detect defectively treated leaves, and means connected with said detector and controlling said mechanism to deposit said defectively treated leaves in a separate group from normally treated leaves.

8. A tobacco sorting device for treated tobacco leaves comprising suction mechanism for the leaves capable of depositing the leaves in either one of a plurality of groups, a detector co-acting with said mechanism to detect defectively treated leaves, means connected with said detector and controlling said mechanism to deposit said defectively treated leaves in a separate group from normally treated leaves, said means including an electro magnetic device controlling the operation of said mechanism, an electric circuit connected to said electro magnetic device, and a circuit maker and breaker operated by said detector for making and breaking said circuit.

9. A tobacco sorting device for treated tobacco leaves comprising suction mechanism for the leaves capable of depositing the leaves in either one of a plurality of groups, a detector co-acting with said mechanism to detect defectively treated leaves, and means connected with said detector and controlling said mechanism to deposit said defectively treated leaves in a separate group from normally treated leaves, said detector comprising a yieldable feeler engaging the leaves.

10. A tobacco sorting device comprising leaf handling means including a moving leaf support, a detector having a feeler yieldingly urged against said support movable in response to leaves passing between said feeler and support, and suction instrumentalities connected to said detector and said means to control the operation thereof in response to the action of said leaves on said feeler.

11. The combination with tobacco stemming mechanism, of detector means acting on the leaves passing through said mechanism to detect the presence of stem portions of a predetermined thickness, and suction sorting mechanism controlled by said detector.

12. The combination with tobacco stemming mechanism, of a moving support for forwarding the leaves, of a detector means having a feeler arranged to engage leaves on said support to detect the presence or absence of a stem portion of over a predetermined thickness, and suction sorting mechanism controlled by said detector.

13. The combination with tobacco stemming mechanism, of a moving support for forwarding the leaves, a detector having a feeler arranged to engage leaves on said support to detect the presence or absence of a stem portion of over a predetermined thickness, and suction sorting mechanism controlled by said detector, said feeler comprising a yieldable arm carrying a roller positioned to engage the leaves.

14. The combination with tobacco stemming mechanism delivering tobacco leaves endwise with their blades outspread, of means including a feeler extending transversely across the mid portion of said endwise moving leaf for detecting the presence of a stem portion of over a predetermined thickness.

15. The combination with mechanism for removing the stems of leaves from the blade portions thereof, of detector means coacting with said mechanism to detect the presence of stem portions which said mechanism failed to remove.

16. The combination with mechanism for removing the stems of leaves from the blade portions thereof, of detector means coacting with said mechanism to detect the presence of stem portions which said mechanism failed to remove, and suction sorting mechanism controlled by said detector means.

PETER MARTIN NEJEDLY.